Dec. 30, 1930.  A. F. GILLET  1,787,068
BLADE ATTACHING MEANS FOR WINDSHIELD WIPERS
Filed April 21, 1930   2 Sheets-Sheet 1
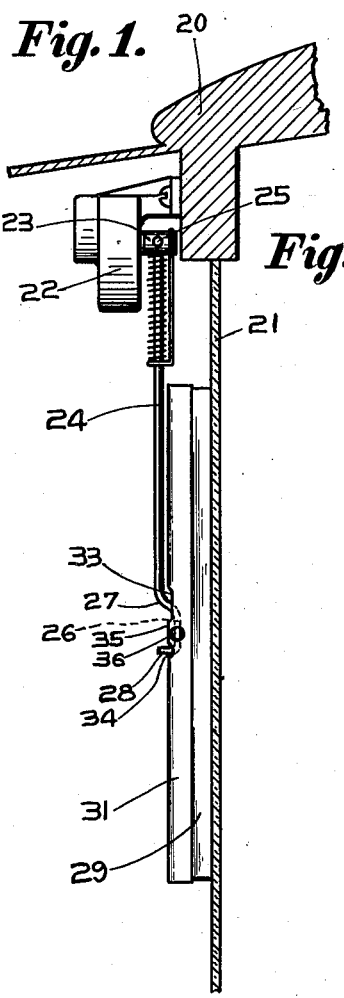
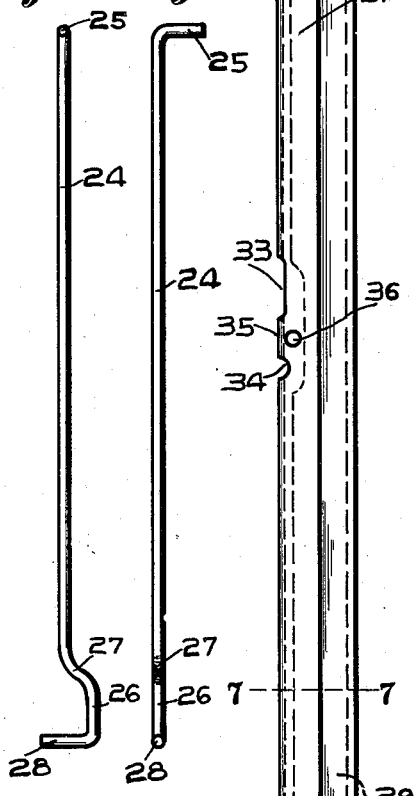
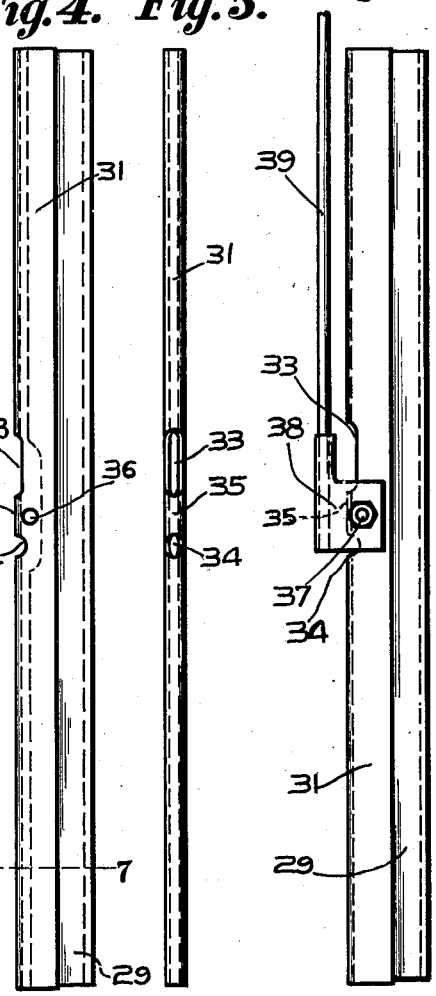
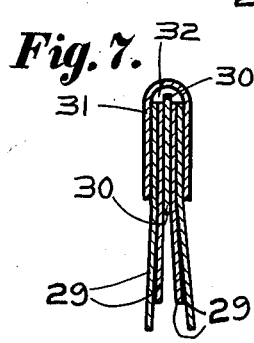
Inventor
A. F. Gillet
By Arthur H. Sturges
Attorney Dec. 30, 1930.   A. F. GILLET   1,787,068
BLADE ATTACHING MEANS FOR WINDSHIELD WIPERS
Filed April 21, 1930   2 Sheets-Sheet 2
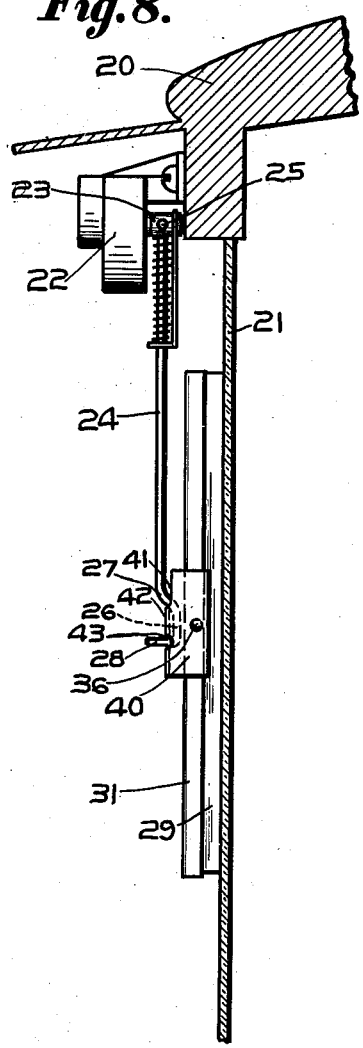
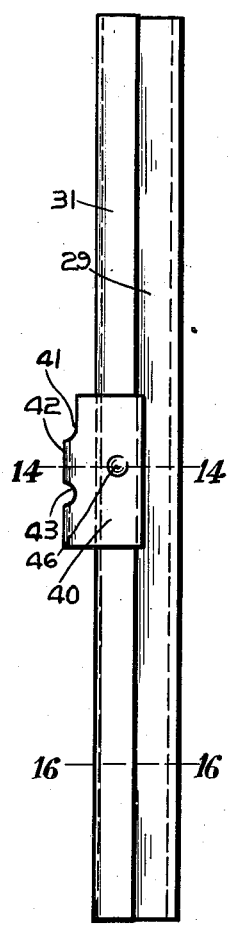
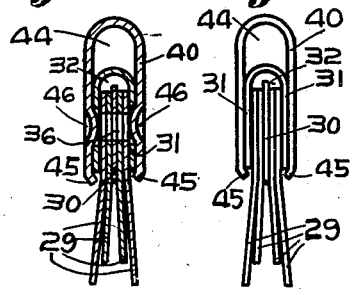
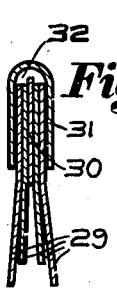
Inventor
A. F. Gillet
By Arthur H. Sturges
Attorney Patented Dec. 30, 1930

1,787,068

UNITED STATES PATENT OFFICE

ALEXIS F. GILLET, OF OMAHA, NEBRASKA, ASSIGNOR TO JUBILEE MANUFACTURING COMPANY, OF OMAHA, NEBRASKA, A CORPORATION OF NEBRASKA

BLADE-ATTACHING MEANS FOR WINDSHIELD WIPERS

Application filed April 21, 1930. Serial No. 445,846.

The present invention relates to windshield wipers, and more particularly to an improved blade attaching means therefor.

It is well known in the art that the various types of windshield wipers include a wiping member which is secured to a reciprocating arm by means of a bolt which carries a nut, and considerable difficulty has been encountered in the replenishing of worn wipers upon these arms, and also in the loss of the nuts and bolts which connect them to the spring arm.

Considerable difficulty has also been encountered in removing and replacing these nuts and bolts, and particularly when it is raining, snowing or sleeting and under such conditions as are unfavorable to the handling of these relatively small and delicate parts.

It is therefore an object of the present invention to provide an improved means for attaching these blades to the spring arm in such a manner that the blades may be quickly and easily removed from the spring arm and a substitute blade be mounted thereon, all without the use of nuts, bolts or other separate or detachable fastening means.

Another object of the present invention is to provide an improved construction of wiper arm and an improved construction of socket for the wiper which co-operates with the arm for holding the wiper firmly upon the end of the arm when the wiper is in position and for admitting of the quick and easy detachment of the wiper when the same is manipulated by bending the arm out of normal position and away from the windshield.

Another feature of the present invention is to provide a socket construction which may be incorporated in the wiper structure or which admits of the construction of the socket on a separate piece or strip adapted for attachment to wipers which are already manufactured so that the invention may be quickly and easily incorporated in new structures, or may be readily applied or adapted to wipers which are already manufactured and in use.

A still further object of the present invention is to provide this improved detachable connection between the wiper arm and the wiper which adheres as closely as possible to the present day construction of both the arm and the wiper so that in the manufacture of these parts but very slight changes in the operations and constructions need be resorted to to carry out the features of the present invention, and thus the present invention embodies features which make it commercially practicable and desirable without unduly increasing the cost of manufacture, but which rather reduces such cost, and which accomplishes the new result desired.

A still further object of the present invention is to provide certain improvements in a windshield wiper which are of extreme simplicity and which comprise merely the peculiar formation of the outer end of the spring wiper arm and the provision of a slot and an aperture in the back portion of the wiper blade, such back portion being either integral with the well known construction or in the form of a separate piece which may be readily applied to the old form of wiper.

With the foregoing and other objects in view, the invention will be more fully described hereinafter, and will be more particularly pointed out in the claim appended hereto.

In the drawings, wherein like symbols refer to like or corresponding parts throughout the several views.

Figure 1 is a fragmentary sectional view of the forward portion of a vehicle top showing the windshield, and showing a wiper constructed according to the present invention mounted thereon.

Figure 2 is a detail enlarged side elevation of an improved spring wiper arm.

Figure 3 is a front elevation of the same.

Figure 4 is an enlarged detail side elevation of a wiper constructed according to the present invention.

Figure 5 is a front edge view of the same.

Figure 6 is a side elevation of the improved wiper attached to the old form of spring wiper arm wherein the nut and bolt are used.

Figure 7 is an enlarged sectional view taken through the improved wiper, substantially on the line 7—7 of Figure 4.

Figure 8 is a fragmentary section taken through the forward upper portion of a closed automobile body having the wiper of this invention applied thereto and showing a slight modification in the blade attaching means.

Figure 9 is a side elevation showing in detail a wiper constructed according to the modified form in Figure 8 and with the detachable socket applied thereto.

Figure 10 is a transverse section taken through the wiper with its improved socket, substantially on the line 14—14 of Figure 9.

Figure 11 is an end elevation of a wiper having the improved socket applied thereto, and Figure 12 is a transverse section taken on the line 16—16 of Figure 9 through the wiper shown therein.

Referring now to the drawings, and first to the form shown in Figures 1 to 7, 20 designates the forward portion at the top of a closed car body, the extreme forward portion thereof being shown, and 21 designates the usual windshield mounted therein. Secured to the body 20 above and forwardly of the windshield 21 is the usual operating motor 22 which may be electrically or otherwise driven and which is provided with a reciprocating shaft 23, all in the usual manner.

Detachably connected to the shaft 23 is a spring wiper arm 24, best shown in Figures 2 and 3. The arm 24 comprises a long shank having its upper end bent at substantially right angles to provide a locking pin 25 adapted to engage in the shaft 23 as shown in Figure 1 and to thus extend laterally or transversely with respect to the top 20 and windshield 21. The lower end of the arm 24 is provided with a backwardly or rearwardly offset shank 26, the shank 26 being relatively short and connected to the body portion of the arm 24 by a gradually curved or rounded shoulder 27. The lower end of the shank 26 terminates in an outwardly extending finger 28 which is spaced from the shoulder 27 but which lies in the same plane therewith.

The wiper itself is of any suitable construction but is provided in its back with a socket which is shaped and constructed for co-operation with the finger 28 and shank 26, the same together with the curved portion 27 providing a rearwardly offset hook portion, for detachably connecting the spring arm to the wiper.

As shown in Figures 4, 5 and 7, the wiper may comprise flexible strips 29 of rubber or the like which may be separated into groups at opposite sides of a partition strip 30 which is of less width than the strip 29 and which lies between the inner end thereof, the whole being assembled and clamped together by a back or channel strip 31. The back or channel strip 31 is of a single length of sheet metal which is overturned longitudinally upon itself and which is of sufficient inherent resiliency to firmly bind against the opposite outer sides of the groups of flexible strips 29 so as to hold the same firmly together and against the opposite sides of the partition strip 30. It will be noted that the overturned or back edge portion of the channel strip 31 is spaced from the inner edges of the strips 29 and 30 to provide a space 32, and this space serves the purpose of accommodating the shank 26, and admitting of the quick and easy detachment of the hook portion of the wiper arm 24 with the back or channel strip 31.

The wiper element may be of any suitable length, and intermediate its ends is provided with a socket constructed according to the present invention. The socket comprises an elongated slot 33 of sufficient length to admit the introduction and removal of the finger 28 therethrough, the slot 33 being formed in the extreme rear edge portion of the channel strip 31, as shown to advantage in Figures 4 and 5. Spaced downwardly from the elongated slot 33, with reference to the present disclosure, the channel strip 31 is provided also in its rear edge portion with an aperture 34 of a size adapted to freely receive the finger 28 therethrough but to prevent any appreciable play or movement between the finger and the wiper element.

By spacing the aperture 34 from the adjacent end of the slot 33 there is provided in the back edge of the strip 31 an intermediate strap or retaining portion 35 which is of a length, in the direction of the length of the wiper element, not greater than the length of the shank 26 of the hook, and which is also of a length not greater than that of the finger 28. The back or channel strip 31 may be provided intermediate its ends, and preferably opposite the strap portion 35, with the usual aperture or opening 36 for the reception of the usual bolts 37, as shown in Figure 6, and which secures the clip 38 of usual form carried upon the outer end of the usual spring wiper arm 39.

It is apparent therefore the wiping elements constructed according to the present invention and as shown in Figures 4 and 5 provided with the aperture 36 therethrough may be readily used or interchanged with the ordinary spring wiper arms 39, as shown in Figure 6.

In use, the wiper element is used in the ordinary manner by mounting it upon the end of a reciprocating arm. In the present instance, Figure 1, the reciprocating arm 24 is hooked in the socket formed in the back of the wiper element and the spring arm presses the wiper element against the windshield 21 in the ordinary manner. When it is desired to remove the wiper element it is only necessary to spring the lower end of the wiper arm 24 outwardly from the windshield a distance sufficient to admit of the turning or swinging of the wiper element in an edgewise direction around upon the hook at substantially right angles to the spring arm 24 so as to move the finger 28 inwardly through the opening 24 and move the shank 26 outwardly through the slot 33. When the wiper element is tilted upon the arm 24 to a suitable angle for the escape of the outer end of the finger 28 inwardly beyond the strap 35, the wiper element is then moved longitudinally so as to shift the finger 28 across the inner side of the strap 35 and into the slot 33.

The wiper element may now be withdrawn from the end of the spring arm 24. A new wiper element similarly constructed may be easily mounted upon the hook by reversing the operation. The finger 28 is first inserted in the slot 33 and tilted therein at such an angle as to pass beneath the strap 35, shifting the wiper element or the arm 24 in such direction as to bring the outer end of the finger 28 into register with the opening 34. The wiper element 24 is then swung into parallel relation with respect to the rear edge of the wiper element, as shown in Figure 1, whereupon the parts are interlocked and the wiper element cannot escape from the free end of the spring arm 24. It is thus seen that there is utilized no bolts, nuts, set screws or the like for connecting the wiper element upon the spring arm.

Referring now to Figures 8 to 12, both inclusive, the operating arm 24 and the parts which operate the same are of the construction shown in Figure 1 and the modification resides in the provision of a resilient back portion 40 which is bent substantially U-shape and adapted to embrace the opposite sides of the channel strip 31 of the wiper element and which is provided in its rear edge or closed portion with a longitudinal slot 41 similar to the slot 33, but which may open through one end of the back portion 40.

The back portion 40 is also provided with the strap portion 42 and an aperture 43 which is spaced from the slot 41 by the strap portion 42. This back portion 40 or clip is secured over the channel strip 31 in such manner as to provide a space 44 similar to the space 32, and shown in Figure 10, for the reception and operation of the hook upon the end of the spring arm 24.

The back portion 40, being in the form of a resilient clip of sheet metal or the like, is of sufficient depth to engage across the opposite sides of the channel strip 31 and is provided with inturned flanges or edges 45 along its free edges adapted to engage over and extend inwardly about the longitudinal edge portions of the channel strip 31 for the purpose of holding the back portion 40 from oscillating or pivoting upon the wiper element. The opposite sides or jaws of the back portion 40 are provided with depressions or indentations 46 adapted to register with the opposite ends of the opening 36 which is formed through the wiper element.

The back portion 40 of this invention with its slot 41, strap 42 and aperture 43 may be quickly and easily substituted upon the channel strip 31 of the usual wiper element so as to detachably engage the free end of the spring arm 24 which also may be quickly and easily substituted for the spring arm 39 and its attaching clip 38, the bolt 37 with its nut, lock washer and the like. Thus it is readily seen that no separate fastening devices, bolts or the like are thus employed and when a wiper element becomes worn it may be quickly and easily replaced by merely unhooking it from the free end of the arm 24 and replacing a new wiper element in its stead.

The back portions or clips 40 may be quickly secured over the usual type of wiper element where it is desired to substitute the improved coupling means, and in the manufacture of the device it is apparent that the only additional steps required are in punching the channel strip 31 to provide the slots and the aperture but that this operation more than offsets the operations and disadvantages of making and handling the bolts 37, nuts and other parts connected therewith.

The present invention also removes possibility of loosing the separate fastening devices, such as the bolt 37. The interlocking parts are rigid and remain in proper position to admit of the quick and easy separation and connection of the parts.

It is obvious that various changes and modifications may be made in the details of construction and design of the above specifically described embodiment of this invention without departing from the spirit thereof, such changes and modifications being restricted only by the scope of the following claim.

What is claimed is:—

In combination with a wiper element having a transverse opening therethrough, a sheet metal clip of U-shape resiliently engaging over the back portion of the wiper element and provided in opposite sides with indentations engaging in the opposite ends of said aperture of the wiper element for holding the clip in position thereon, said clip provided at its free edges with inturned flanges engaging the edge portions of the back strip of the wiper element for holding the clip thereto, and a spring arm having a free end hook portion detachably engaged with said clip.

In testimony whereof, I have affixed my signature.

ALEXIS F. GILLET.